US011502820B2

(12) United States Patent
Ratha et al.

(10) Patent No.: US 11,502,820 B2
(45) Date of Patent: Nov. 15, 2022

(54) PRIVACY-ENHANCED DECISION TREE-BASED INFERENCE ON HOMOMORPHICALLY-ENCRYPTED DATA

(71) Applicant: International Business Machines Corporation, Armonk, NY (US)

(72) Inventors: Nalini K. Ratha, Yorktown Heights, NY (US); Kanthi Sarpatwar, Elmsford, NY (US); Karthikeyan Shanmugam, Elmsford, NY (US); Sharathchandra Pankanti, Darian, CT (US); Karthik Nandakumar, Singapore (SG); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/884,567

(22) Filed: May 27, 2020

(65) Prior Publication Data
US 2021/0376995 A1    Dec. 2, 2021

(51) Int. Cl.
*H04L 9/00*       (2022.01)
*G06F 9/30*       (2018.01)
(Continued)

(52) U.S. Cl.
CPC ............ *H04L 9/008* (2013.01); *G06F 9/3013* (2013.01); *G06F 9/3887* (2013.01); *H04L 9/065* (2013.01); *H04L 9/0618* (2013.01); *H04L 9/3265* (2013.01)

(58) Field of Classification Search
CPC ....... H04L 9/008; H04L 9/0618; H04L 9/065; H04L 9/3265; G06F 9/3013; G06F 9/3887
See application file for complete search history.

(56) References Cited

U.S. PATENT DOCUMENTS 5,937,188 A * 8/1999 Freeman ................. G06F 8/443
                                                    717/145
9,031,229 B1    5/2015 Nita
(Continued)

OTHER PUBLICATIONS

X. Sun, P. Zhang, J. K. Liu, J. Yu and W. Xie, "Private Machine Learning Classification Based on Fully Homomorphic Encryption," in IEEE Transactions on Emerging Topics in Computing, vol. 8, No. 2, pp. 352-364, Apr. 1-Jun. 2020, doi: 10.1109/TETC.2018.2794611. (Year: 2018).*

*Primary Examiner* — Catherine Thiaw
*Assistant Examiner* — Hany S. Gadalla
(74) *Attorney, Agent, or Firm* — Jeffrey S. LaBaw; David H. Judson

(57) ABSTRACT

A technique for computationally-efficient privacy-preserving homomorphic inferencing against a decision tree. Inferencing is carried out by a server against encrypted data points provided by a client. Fully homomorphic computation is enabled with respect to the decision tree by intelligently configuring the tree and the real number-valued features that are applied to the tree. To that end, and to the extent the decision tree is unbalanced, the server first balances the tree. A cryptographic packing scheme is then applied to the balanced decision tree and, in particular, to one or more entries in at least one of: an encrypted feature set, and a threshold data set, that are to be used during the decision tree evaluation process. Upon receipt of an encrypted data point, homomorphic inferencing on the configured decision tree is performed using a highly-accurate approximation comparator, which implements a "soft" membership recursive computation on real numbers, all in an oblivious manner.

21 Claims, 11 Drawing Sheets

700 {
- PRIVATE_INFER(DATA POINT *d*, DECISION TREE *T*):
- REPLACE THE HARD COMPARISON OF THE DECISION NODES WITH THE FOLLOWING COMPUTATION FUNCTION:
- $Eval(a \geq b) = \dfrac{a^n}{a^n + b^n}$ FOR A LARGE PARAMETER $n$
- THE SOFT-MEMBERSHIP (*SM*) OF A DATAPOINT AT ANY NODE (*K*) IS COMPUTED RECURSIVELY BY THE FOLLOWING EXPRESSION:
- $SM(K,t,v) = \begin{cases} SM(P, t_r, v_r) \times Eval(v \geq t) & \text{IF } K \text{ IS THE RIGHT CHILD OF } P \\ SM(P, t_l, v_l) \times Eval(v < t) & \text{IF } K \text{ IS THE LEFT CHILD OF } P \end{cases}$
- *SM* IS EXPECTED TO BE CLOSE TO 0 IF THE DATA POINT DOESN'T BELONG TO THE NODE K AND CLOSE TO 1 IF IT DOES.

702 {
- FOR EACH CLASS *C*:
- LET $\mathcal{L} = \{L_1, L_2, ..., L_k\}$ BE THE SET OF LEAF NODES WITH LABEL *C*.
- COMPUTE AGGREGATED CLASS CONFIDENCE VALUES AS:
- $ACC(C) = \displaystyle\sum_{L \in \mathcal{L}} SM(L, t_l, v_l)$ 704 {
- RETURN THE CLASS LABEL WITH MAXIMUM *ACC*(.) VALUE: $argmax_C ACC(C)$.

(51) Int. Cl.
*H04L 9/06* (2006.01)
*H04L 9/32* (2006.01)
*G06F 9/38* (2018.01)

(56) References Cited

U.S. PATENT DOCUMENTS

| | | | |
|---|---|---|---|
| 10,078,801 B2* | 9/2018 | Abbas | G06Q 30/0201 |
| 2003/0037016 A1* | 2/2003 | Vilalta | G06K 9/6282 |
| | | | 706/47 |
| 2005/0234688 A1* | 10/2005 | Pinto | G05B 17/02 |
| | | | 703/13 |
| 2006/0085651 A1 | 4/2006 | Staddon et al. | |
| 2007/0294068 A1* | 12/2007 | Jones | G16C 20/70 |
| | | | 703/11 |
| 2011/0004449 A1* | 1/2011 | Rossignac | G06F 17/10 |
| | | | 703/2 |
| 2015/0339415 A1* | 11/2015 | Klein | G06F 30/20 |
| | | | 703/6 |
| 2016/0173124 A1* | 6/2016 | Majumdar | H03M 7/3097 |
| | | | 708/203 |
| 2017/0061284 A1* | 3/2017 | Amano | G06N 5/025 |
| 2017/0132383 A1* | 5/2017 | Myers | G06F 3/04847 |
| 2019/0005396 A1* | 1/2019 | Krutsch | G06N 5/045 |
| 2019/0182216 A1 | 6/2019 | Gulek et al. | |
| 2019/0384304 A1* | 12/2019 | Towal | G05D 1/0221 |
| 2020/0019867 A1 | 1/2020 | Nandakumar et al. | |
| 2020/0151356 A1* | 5/2020 | Rohloff | G06F 21/6227 |
| 2020/0336292 A1* | 10/2020 | Soriente | H04L 9/008 |
| 2021/0081807 A1* | 3/2021 | Tueno | G06N 5/003 |

\* cited by examiner

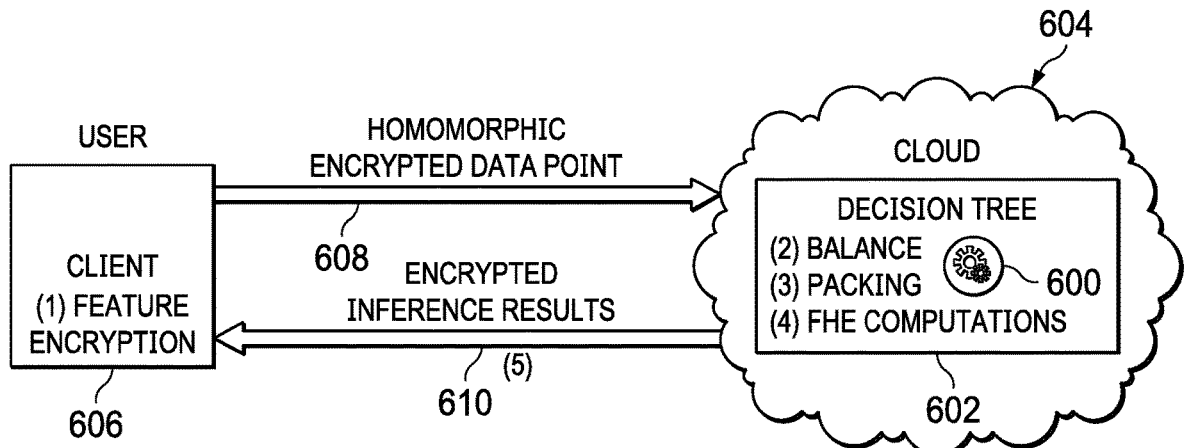

FIG. 6

**PRIVATE_INFER(DATA POINT *d*, DECISION TREE *T*):**
- REPLACE THE HARD COMPARISON OF THE DECISION NODES WITH THE FOLLOWING COMPUTATION FUNCTION:
- $\text{Eval}(a \geq b) = \dfrac{a^n}{a^n + b^n}$ FOR A LARGE PARAMETER $n$
- THE SOFT-MEMBERSHIP (*SM*) OF A DATAPOINT AT ANY NODE (*K*) IS COMPUTED RECURSIVELY BY THE FOLLOWING EXPRESSION:
- $SM(K,t,v) = \begin{cases} SM(P,t_r,v_r) \times \text{Eval}(v \geq t) & \text{IF } K \text{ IS THE RIGHT CHILD OF } P \\ SM(P,t_l,v_l) \times \text{Eval}(v < t) & \text{IF } K \text{ IS THE LEFT CHILD OF } P \end{cases}$
- *SM* IS EXPECTED TO BE CLOSE TO 0 IF THE DATA POINT DOESN'T BELONG TO THE NODE K AND CLOSE TO 1 IF IT DOES.

700

- FOR EACH CLASS *C*:
  - LET $\mathcal{L} = \{L_1, L_2, ..., L_k\}$ BE THE SET OF LEAF NODES WITH LABEL *C*.
  - COMPUTE AGGREGATED CLASS CONFIDENCE VALUES AS:
    $ACC(C) = \sum_{L \in \mathcal{L}} SM(L, t_l, v_l)$

702

- RETURN THE CLASS LABEL WITH MAXIMUM ACC (.) VALUE: $\text{argmax}_C \ ACC(C)$.

PRIVACY-ENHANCED DECISION TREE-BASED INFERENCE ON HOMOMORPHICALLY-ENCRYPTED DATA

BACKGROUND OF THE INVENTION

Technical Field

This disclosure relates generally to the use of fully homomorphic encryption operations to facilitate inferencing against encrypted data.

Background of the Related Art

Decision Trees are very popular machine learning models used in both classification and regression settings. Typically, a decision tree consists of a binary tree where each non-leaf node makes a decision by comparing a feature vector component to a threshold and splitting the decision path at that node. Leaf nodes contain decisions, real values or class labels depending on whether the task is classification or regression. Several greedy algorithms have been proposed to learn a decision tree from training data. A common feature of these algorithms is to greedily search for a leaf node to split to grow the current tree that minimizes cross entropy or some other metric.

Decision trees are very effective when the number of training samples is limited, because evaluating a candidate split is less expensive during training, and because other complex models (like neural networks) cannot be easily trained due to large number of parameters. One of the appealing properties of decision trees is that they are invariant to feature scaling, thereby reducing any explicit need for standardization during training. Combined with ensemble methods, such as Gradient boosted trees, decision trees are very important primitives for modern day machine learning, e.g., classification and regression tasks over tabular datasets.

There has been a recent surge and renewed interest in learning decision trees due to their attractive property of being interpretable. This has included efforts to transfer information from complex models (neural networks and boosted trees) into a single decision tree to leverage that property. When machine learning models are used to aid decisions made by human end users, interpretable models (like decision trees) that are easy to train in a small data regime often are a preferable choice.

Machine learning algorithms in general and decision tree algorithms in particular have been studied through the lens of privacy preservation for a long time. Several types of privacy risks from inference attacks in the lifecycle of a decision tree classifier have been identified including, and of most relevance here, the privacy risk involved in using the decision tree classifier for evaluating classification queries in the inferencing phrase. One solution that has been proposed to address this risk is to host the trained decision tree using a secure server, and to process the queries in part using advanced cryptographic techniques. One such cryptographic technique is known as fully homomorphic encryption (FHE), which provides a way to enable secure computation on client data without the need to decrypt it, while also concurrently preserving the secrecy of the decision tree.

While homomorphic encryption provides significant advantages, decision tree-based models do not lend themselves to being processed efficiently using FHE techniques. This problem arises (in the FHE context) because the basic operation performed at a model node is a comparison of two values, and this comparison (when performed using FHE) is a non-linear operation (e.g., using a sigmoid function $f(x) = 1/(1+e^{-x})$). As a consequence, the comparisons are fuzzy, and further because scaling is difficult as scaling factors are non-uniform. As such, these branching computations are not practical to implement in a fully homomorphic encryption scheme, and thus it remains a challenge to provide FHE-based inferencing on decision trees.

BRIEF SUMMARY

This disclosure provides a technique for computationally-efficient privacy-preserving homomorphic inferencing against a decision tree. Typically, the decision tree is located in a cloud environment, and inferencing is carried out by a server against encrypted data points provided by one or more clients. According to this approach, fully homomorphic computation is enabled with respect to the decision tree by intelligently configuring the decision tree and the real number-valued features that are applied to the tree. To that end, and to the extent the decision tree is unbalanced, the server first balances the tree for efficient single instruction, multiple data (SIMD) operation mapping. A cryptographic packing scheme is then applied to the balanced decision tree and, in particular, to one or more entries in at least one of: an encrypted feature set, and a threshold data set, that are to be used during the decision tree evaluation process. Typically, the balancing and packing operations are carried out in a pre-processing stage, i.e., before receipt of a client query against the decision tree.

Upon receipt of an encrypted data point from a client, the server then performs homomorphic inferencing on the configured decision tree with respect to the encrypted data point. This inferencing is performed using a highly-accurate approximation comparator, which implements a "soft" membership recursive computation on real numbers. For a given decision node, the comparison operation comprises a plurality of sub-operations directed to conditional branches of the decision tree, and the sub-operations and a decision resulting from the comparison operation occur obliviously on real number-valued features of the encrypted data point. Preferably, pairwise comparisons implemented by the plurality of the sub-operations are carried out using a single instruction, multiple data (SIMD) operation. The decision resulting from the comparison operation is computed as a single ArgMax function for an aggregated set of confidence class values.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 depicts the operating scenario in FIG. 5 that is augmented using the techniques of this disclosure;

FIG. 7 depicts an implementation of a privacy-enhanced decision tree inferencing algorithm according to this disclosure;

DETAILED DESCRIPTION OF AN ILLUSTRATIVE EMBODIMENT

Figure 1:
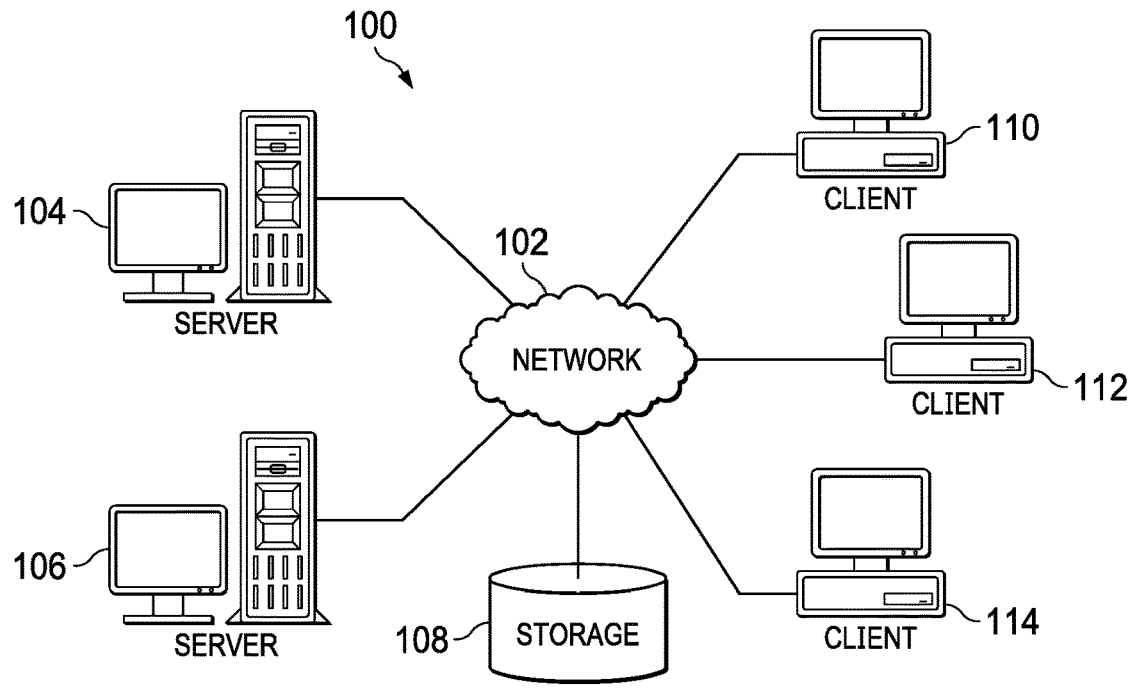
FIG. 1 depicts an exemplary block diagram of a distributed data processing environment in which exemplary aspects of the illustrative embodiments may be implemented.
Figure 2:
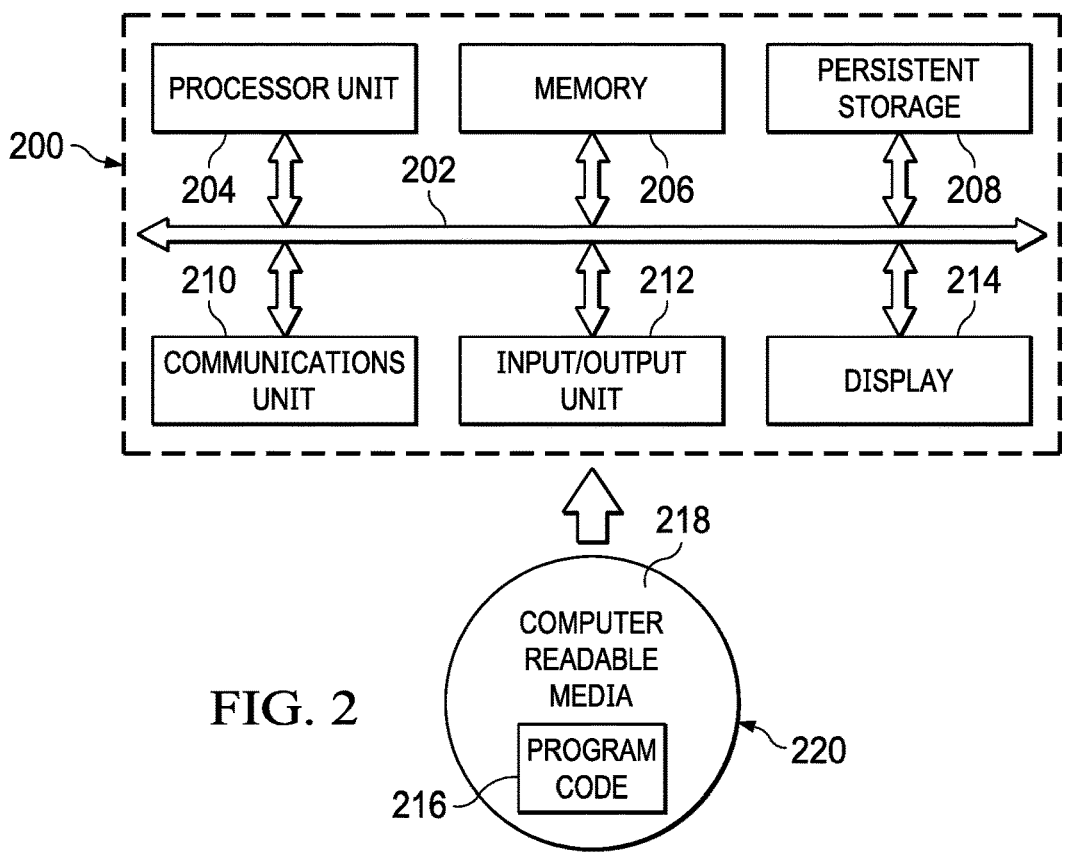
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
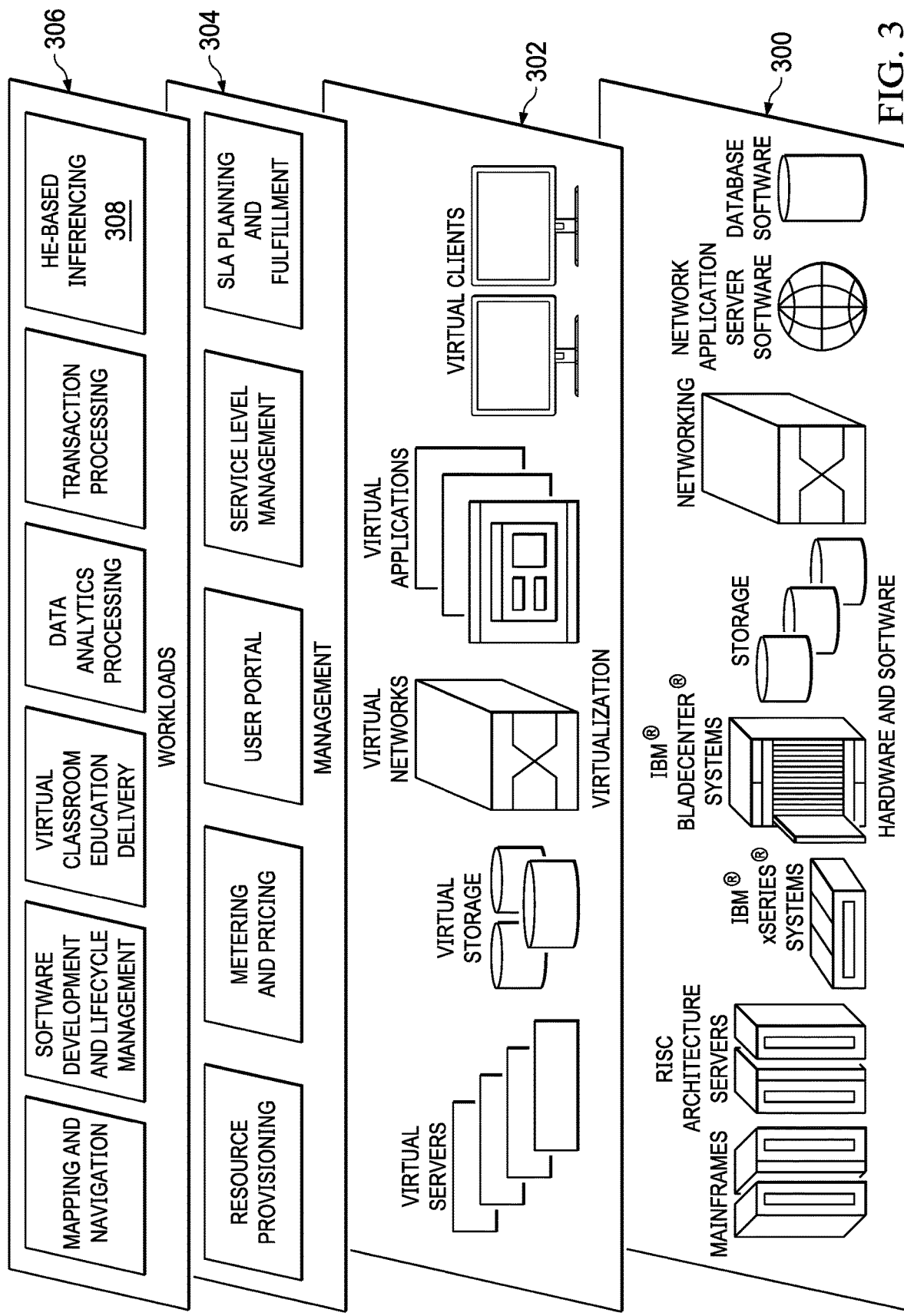
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, a technique for privacy-preserving homomorphic inferencing on homomorphically-encrypted data 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

The above-described commercial implementation is not intended to be limited, but rather is simply one representative embodiment of a client application supported in a cloud computing environment and that interacts with a cognitive service.

Decision Trees

Decision trees consist of decision nodes and leaf nodes. As noted above, decision nodes require comparison operations. Formally, the following definitions are useful to describe a decision tree and these operations.

Definition 1 (Decision Tree): Decision Tree T is a binary tree structure where each node $N \in T$ has an associated triplet $(f_N, t_N, v_N)$, where $f_N$ is a splitting feature, $t_N$ is a threshold, and $v_N$ is a value associated with the node.

Definition 2 (Decision Tree Evaluation): Given a multi-dimensional data point d and a decision tree T, the evaluation of d on T, eval(d,T), is defined recursively, starting from the root node, as follows: (a) if the current node N is a leaf node, then return eval(d,T):=$v_N$; otherwise (b) let $N_l$ and $N_r$ be the left and right child of N. Then (b)(1): if $t_N$>d[$f_N$], set $N_l$ as the current node; otherwise (b)(2), set $N_r$ as the current node. For regression trees, the values are real values for classifier trees, the values are class labels.

Figure 4:
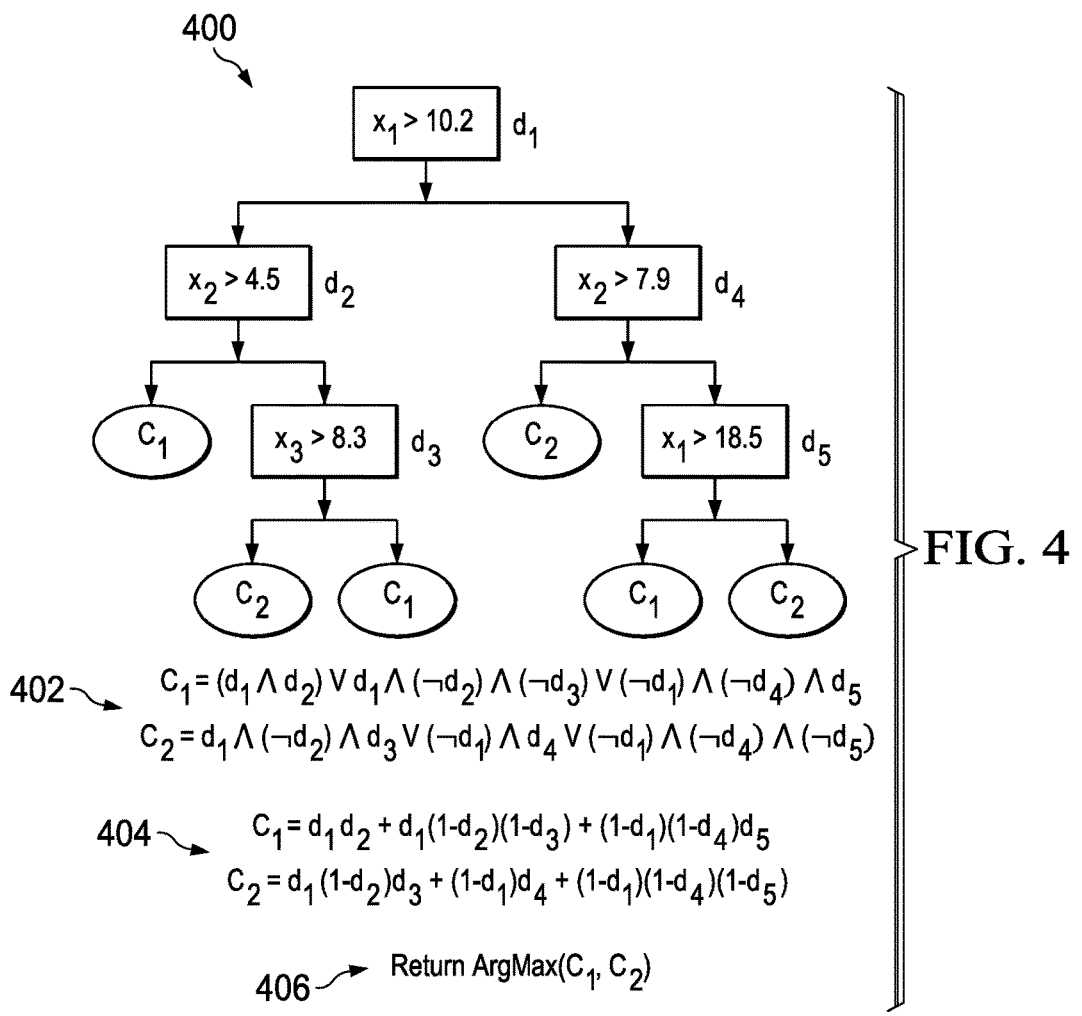
FIG. 4 depicts a representative decision tree.

FIG. 4 depicts a representative decision tree 400 for a two-class problem with three (3) input features. Class membership is based on combining the results of decision nodes using Boolean AND and OR rules, which require multiplication and addition operations, respectively. For example, and given the decision tree in FIG. 4, let $d_i$ denote the binary decision (0 or 1) at node i is evaluated for $C_1$ and $C_2$ as depicted by the operations 402. The final label of the input is the class whose expression evaluates as true. Alternatively, the decision tree can be evaluated using the operations 404, with the result (in either case) then returned as ArgMax ($C_1$, $C_2$). In particular, the class confidence from each node is summed up and the ArgMax of the class confidence is returned. More formally, the arguments of the maxima (abbreviated ArgMax) are the points, or elements, of the domain of some function at which the function values are maximized.

In the FIG. 4 example, the decision tree is said to be "unbalanced" because there are one or more leaf nodes (here, the leaves designated $C_1$ and $C_2$ at the third level of the tree) positioned at a level higher than the lowest level (the bottom) of the tree. A decision tree that does not include any leaf node at any higher level is said to be "balanced."

Homomorphic Encryption

Homomorphic encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. Formally, a cryptosystem is homomorphic with respect to operation ◊, if there exists an operation such that $x_1$ ◊ $x_2$=D(E($x_1$, pk)H(E($x_2$, pk), sk), where E and D represent the encryption and decryption mechanisms, respectively, pk and sk represent the public and private/secret keys, respectively, $x_1$ and $x_2$ are two plaintext operands, and H is a Hadamard product operation. A homomorphic encryption scheme is considered to be fully homomorphic (FHE) if it allows arbitrary computations on the ciphertext. Specifically, given $c_i$=E($x_i$, pk), i=1, 2, . . . , K, an FHE scheme allows the computation of c=g ($c_1$, $c_2$, . . . , $c_K$) such that D(c, sk)=f ($x_1$, $x_2$, . . . , $x_K$) for any arbitrary function f. FHE is often achieved by employing a somewhat homomorphic (SWHE) or leveled HE scheme in combination with a bootstrapping or recryption technique. The SWHE scheme is capable of supporting computations only up to a preset level of complexity determined by its parameters. This is because the ciphertexts are "noisy," and the noise keeps growing with each HE computation, and once the noise grows beyond some parameter-dependent threshold the ciphertext can no longer be decrypted. This problem may be addressed by bootstrapping, which refreshes the ciphertext and reduces its noise level, but at the cost of relying on circular security. Bootstrapping, however, is a computationally-expensive and time-consuming operation. Therefore, for practical feasibility, the number of bootstrapping operations should be kept at a minimum and possibly avoided.

Homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

By way of further background, several FHE schemes have been proposed based on hardness of a computational problem known as Ring Learning with Errors (RLWE). Prominent examples of such schemes include BFV (Brakerski/Fan-Vercauteren), BGV (Brakerski-Gentry-Vaikuntanatha), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations. Furthermore, these schemes support Single Instruction Multiple Data (SIMD) operations, in particular, by packing different plaintext values into different slots in the ciphertext. While this ciphertext packing enables parallelization of addition and multiplication operations, it is not possible to randomly access values in the individual slots of the ciphertext after packing. Rather, only limited operations, e.g., rotation of the slots within the ciphertext, are possible.

When the CKKS scheme (as implemented in the HElib library) for HE operations, real-valued features may be input to the decision tree directly, i.e., there is no requirement to transform the inputs as integers.

Machine Learning-as-a-Service Using Homomorphic Encryption

Figure 5:
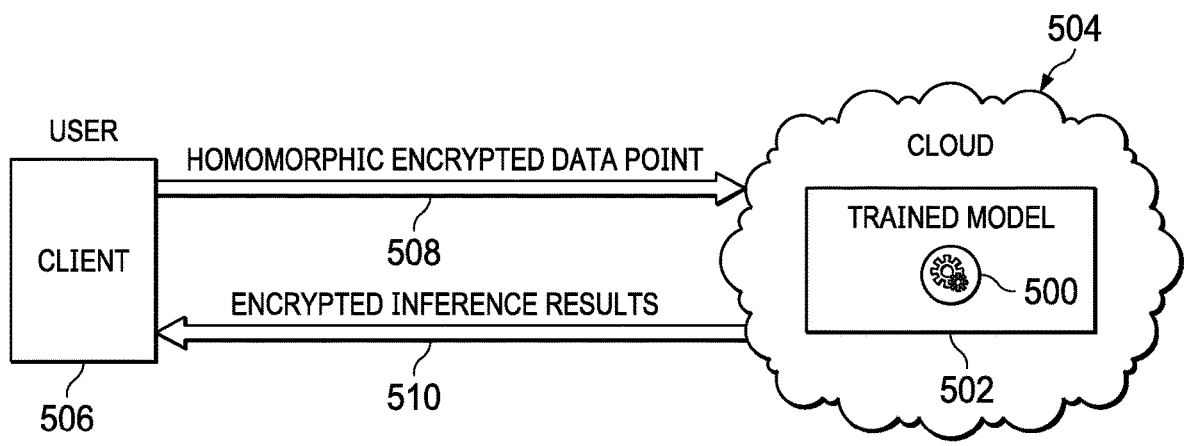
FIG. 5 is a representative Machine Learning as-a-service (MLaaS) operating environment in which the techniques of this disclosure may be implemented.

With reference now to FIG. 5, the basic operating environment for the technique herein is depicted. As shown, in a typical ML as a service scenario, a trained model 500 is hosted on a cloud server 502 (sometimes referred to herein as Cloud) in a cloud computing infrastructure 504 such as described above. The trained model 500 may be exposed as an Application Programming Interface (API) on the cloud 504. In operation, and as a service, the hosting cloud server 502 allows users to run inference queries on the model 500. Typically, a user (sometimes referred to herein as Client) is associated with a client machine 506, and the client and server are configured to operate according to the client-server model previously described. A homomorphic encryption (HE) protocol is enforced across the client-server operating environment such that the Cloud protects the model's privacy while users (Clients) maintain the privacy of their scoring data points returned by the model. In a typical request-response workflow, the client 506 sends an encrypted query 508 (e.g., a data point) to the cloud server 502, the cloud server 502 applies the model and then returns a response 510. The response includes the encrypted inference results. In this manner, privacy-preserving inference problems are securely evaluated.

Thus, as depicted, the Client homomorphically-encrypts its data points and shares them with the Cloud. The Cloud then uses the public key received from the Client to encrypt its model, and it homomorphically-evaluates the decision tree on the encrypted data points.

While the above approach works well to preserve the respective privacy interests of both the requesting user and the cloud provider hosting the model, this type of inferencing is computationally-inefficient for decision tree-based models. In particular, although HE works well at evaluating polynomials of low degree, it is very expensive to perform certain non-polynomial operations such as division, comparison and ArgMax. The technique of this disclosure addresses these computational inefficiencies.

Decision Tree-Based Inferences on Homomorphic-Encrypted Data

With the above as background, the technique of this disclosure is now described. According to this disclosure, and as described above, it is assumed that the Cloud owns/possesses a decision tree-based model T, and that the Client wishes to evaluate its data points on T. Formally, Definitions 1 and 2 (as set forth above) are applied during the decision tree classification, preferably as now described.

In the approach herein, preferably the server (the Cloud) performs certain pre-processing on the tree and, in particular, such that a single SIMD comparison is carried out for all the decision nodes, and a single ArgMax computation is made for all class confidences. As will be seen, this approach enables a highly-accurate approximate comparator, which is referred to herein as a "soft-class membership" computation, to be used to facilitate the classification. With reference now to FIG. 6, the technique of this disclosure is shown. At step (1), the client 606 performs feature encryption with respect to the data point. As in FIG. 5, Cloud 604 comprises server 602 that hosts the decision tree 600. According to this disclosure, step (2) depicts the server performing a tree balancing operation. This operation is not required if the decision tree is already balanced. At step (3), the server 602 also performs a ciphertext packing operation. In particular, preferably the approach herein is implemented with an FHE cryptosystem that uses the CKKS scheme. The CKKS scheme supports SIMD type operations. Accordingly, several floating-point numbers can be packed into a single ciphertext, which facilitate significant parallelism in operations. By applying packing to the balanced decision tree, the server can then exploit the SIMD capability of the CKKS scheme and, in particular, evaluate all the comparison operations involved in the decision tree evaluation using a single ciphertext-based computation. The SIMD packing minimizes the number of FHE comparisons, and preferably all of the decision nodes are computed simultaneously in SIMD form in a single computation. Once packed into a ciphertext, it is not possible for the server to retrieve individual entries in a random-access fashion (thus preserving privacy); however, the server can still perform certain types of operations, e.g., rotation of the ciphertext, which rotates the underlying plaintext entries as well. This rotation is sometimes referred to herein as shuffling, and these operations are also associated with the packing step (3). This ciphertext packet-based approach may be implemented in C++ using HElib. At step (4), and responsive to receipt at the server 602 of the encrypted data point 608, the server then performs FHE-based computations. The computations, as will be described, include a soft-membership (SM) evaluation of each data point at a node against a computation function, computing aggregated class confidence values for each class, and then finding the ArgMax class score. At step (5), the server 602 returns to the client 606 the encrypted result 610 to complete the protocol.

FIG. 7 depicts the basic inferencing algorithm of this disclosure. Preferably, the computation function used by one implementation of the algorithm is defined as follows: $EVAL(a \geq b) = a^n/(a^n + b^n)$, for a large parameter n and both a and b being in the range [0, 1]. The intuition behind this pairwise comparison function is the observation that if a>b, the above quantity tends to 1 as the parameter n increases. Because the computations (the pairwise comparisons) are performed by the server in an encrypted space, their results are also obtained in an encrypted form. Accordingly, the tree evaluation is carried out in an oblivious fashion in the manner now described. In particular, and given the above-identified computation function, a soft-membership evaluation of a data point at any node (K) being computed recursively by the expression is shown at 700. As can be seen, there are two (2) outcomes, corresponding to the node K being either a right child node, or a left child node, of the node being evaluated. The result of this evaluation is expected to be close to 0 if the data point does not belong to the node K, and close to 1 if it does. For each class C, aggregated class confidence values are then computed as shown at 702. At 704, the class label is then returned.

The computation function described above is not intended to be limited, as other functions that facilitate a soft (as opposed to a hard) class membership may be used.

Figure 8:
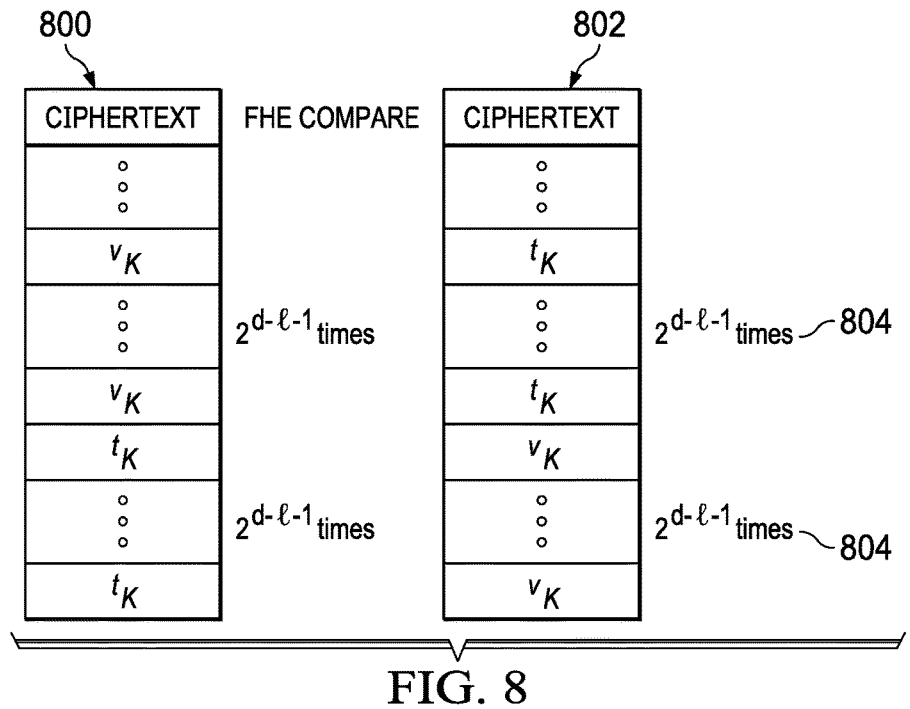
FIG. 8 depicts a generalization of a preferred ciphertext packing scheme implemented by the server.

FIG. 8 depicts how the packing approach herein facilitates the FHE compare operations. In this example, ciphertext 800 is being FHE-compared with ciphertext 802. Let d be the depth of the decision tree (not shown). For each decision node K, at depth l, and for the corresponding feature $v_K$ and threshold $t_K$, a segment ($2^{d-l-1}$) 804 is appended. The reasoning behind this is the K belongs to exactly $2^{d-l}$ decision path computations. Further, half of the above decision paths are accessed by the comparison $v_K \geq t_K$ and the remaining half are accessed by $t_K > v_K$.

The following description provides additional details regarding the above-described ciphertext packing scheme. Suppose the maximum depth of the decision tree is l. Assume, without loss of generality, that the tree is balanced. In particular, if the depth of a certain leaf is l'<l, then replicas of a leaf are added as its left and right child, thus increasing its depth until it becomes l. Now, for a given quantity q, denote [q, $2^r$]=[q, q, . . . $2^r$ times . . . q]. Ciphertext packing at the Cloud then proceeds as follows: assume $N_1$ $N_2$, . . . $N_2^{l+1-1}$ is the order in which nodes of the decision tree are visited in a breadth-first search traversal. The Cloud constructs two ciphertexts, whose packing is given by:

$$T^+ = [tN_1, 2^l][0, 2^l][tN_2, 2^{l-1}][0, 2^{l-1}][tN_3, 2^{l-1}][0, 2^{l-1}] \ldots \text{ and}$$

$$T^- = [0, 2^l][tN_1, 2^l][0, 2^{l-1}][tN_2, 2^{l-1}][0, 2^{l-1}][tN_3, 2^{l-1}] \ldots$$

Similarly, the Server constructs the following ciphertexts:

$$V^+ = [d[f_{N1}], 2^l][0, 2^l][d[f_{N2}], 2^{l-1}][0, 2^{l-1}] \ldots \text{ and}$$

$$V^- = [0, 2^l][d[f_{N1}], 2^l][0, 2^{l-1}][d[f_{N2}], 2^{l-1}][0, 2^{l-1}] \ldots$$

The homomorphic evaluation of the decision tree is then implemented as follows: (1) let $M^+ = T^+ + V^+$ and $M^- = T^- + V^-$; and (2) compute $C \leftarrow EVAL(M^+ \geq M^-)$ in an SIMD fashion. For $i \in [0, \log_2 l]$, rotate the ciphertext to obtain rotate(C, $-2^{l+i}$) and compute the product as follows: C=C×rotate(C, $-2^{l+i}$). The first $2^l$ entries of the resulting ciphertext contains the SM(.) value for each leaf node.

Figure 9:
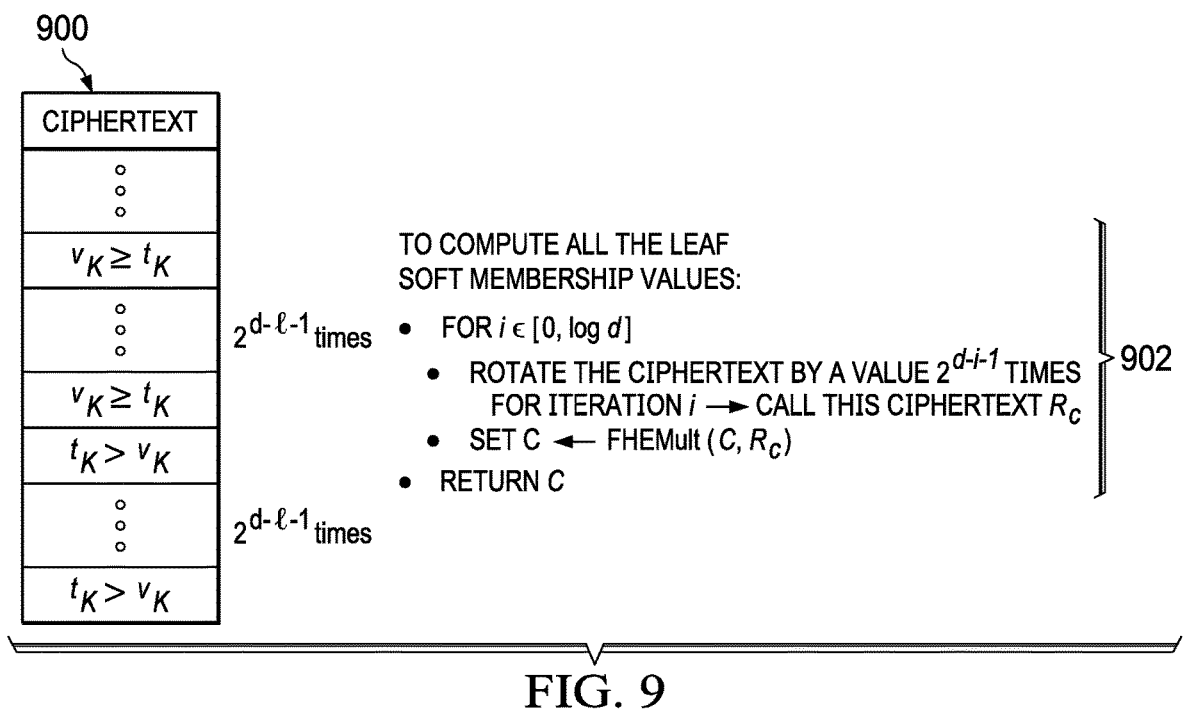
FIG. 9 depicts a generalization of the soft membership computation using the packing scheme shown in FIG. 8.

FIG. 9 depicts the soft membership computation using the packing scheme shown in FIG. 8 and described above. In particular, the FHE compare (of the ciphertexts in FIG. 8) results in the ciphertext (C) 900. The leaf soft membership values are computed by the rotate operations 802, as also previously described.

Figure 10:
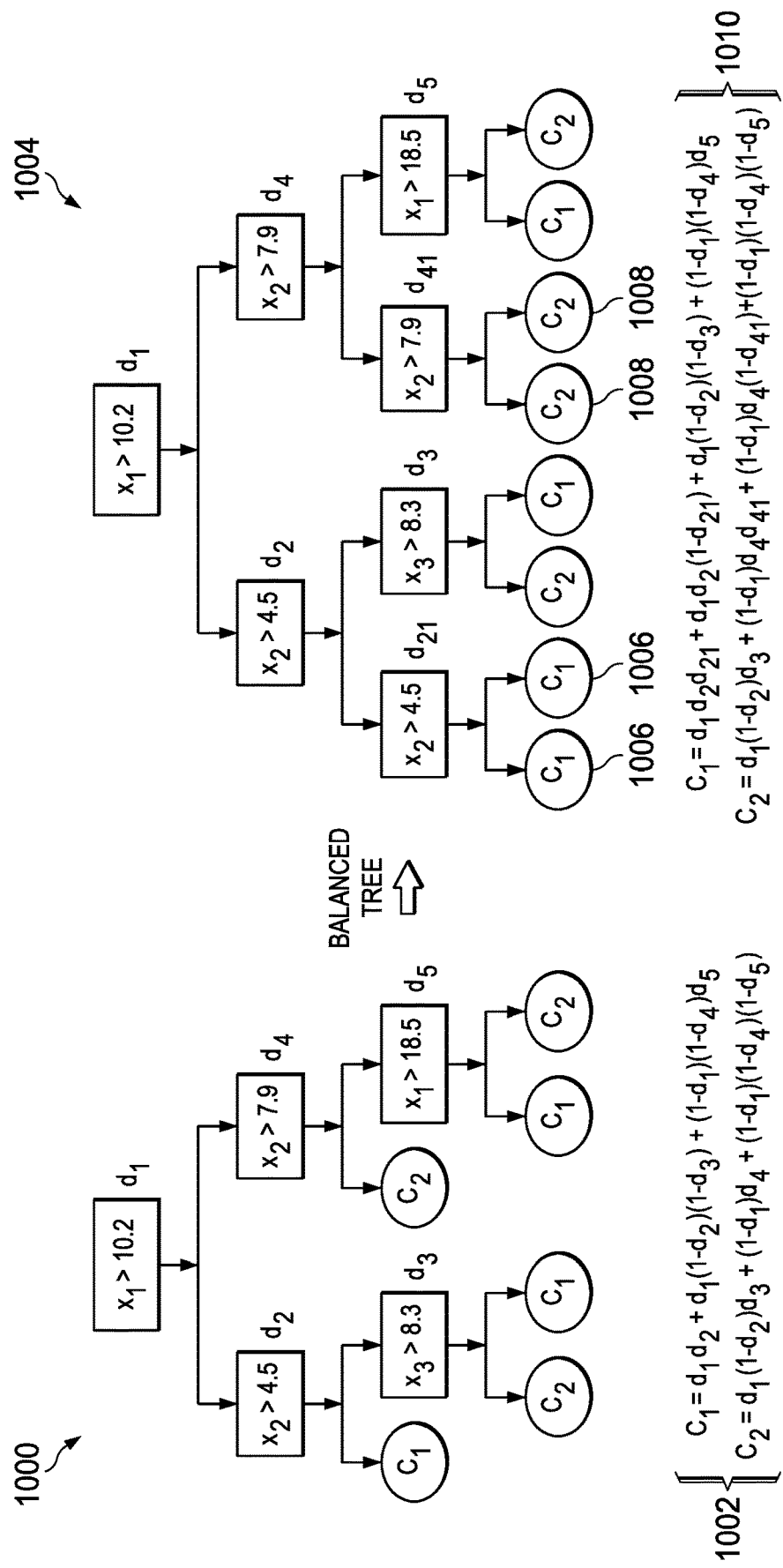
FIG. 10 depicts how an unbalanced decision tree is first balanced to facilitate packing.

By way of example, FIG. 10 depicts the balancing of unbalanced decision tree 1000, which as depicted on the left is another two-class ($C_1$ and $C_2$) problem with three input features ($x_1$, $x_2$ and $x_3$). The techniques herein may be generalized to higher class problems, and any number of input features. In this example, data points $d_1$ through $d_5$ are encrypted, and the $C_1$ and $C_2$ operations are depicted at 1002. The balanced tree 1004 is shown on the right, and this tree incorporates the dummy nodes $d_{21}$ and $d_{41}$, which nodes each produce the same null class values $C_1$ 1006 and $C_2$ 1008, respectively. Thus, dummy node $d_{21}$ is a replica of node $d_2$ but both leaves of the compare computation end up with the same class value ($C_1$). Likewise, dummy node $d_{41}$ is a replica of node $d_4$ but both leaves of the compare computation on this dummy node end up with the same class value ($C_2$). As can be seen, then, in both cases the inclusion of the dummy nodes does not impact the class computations 1010 (or the ArgMax result returned) for the decision tree as a whole. The balancing, however, facilitates the ciphertext packing, as previously described.

Figure 11:
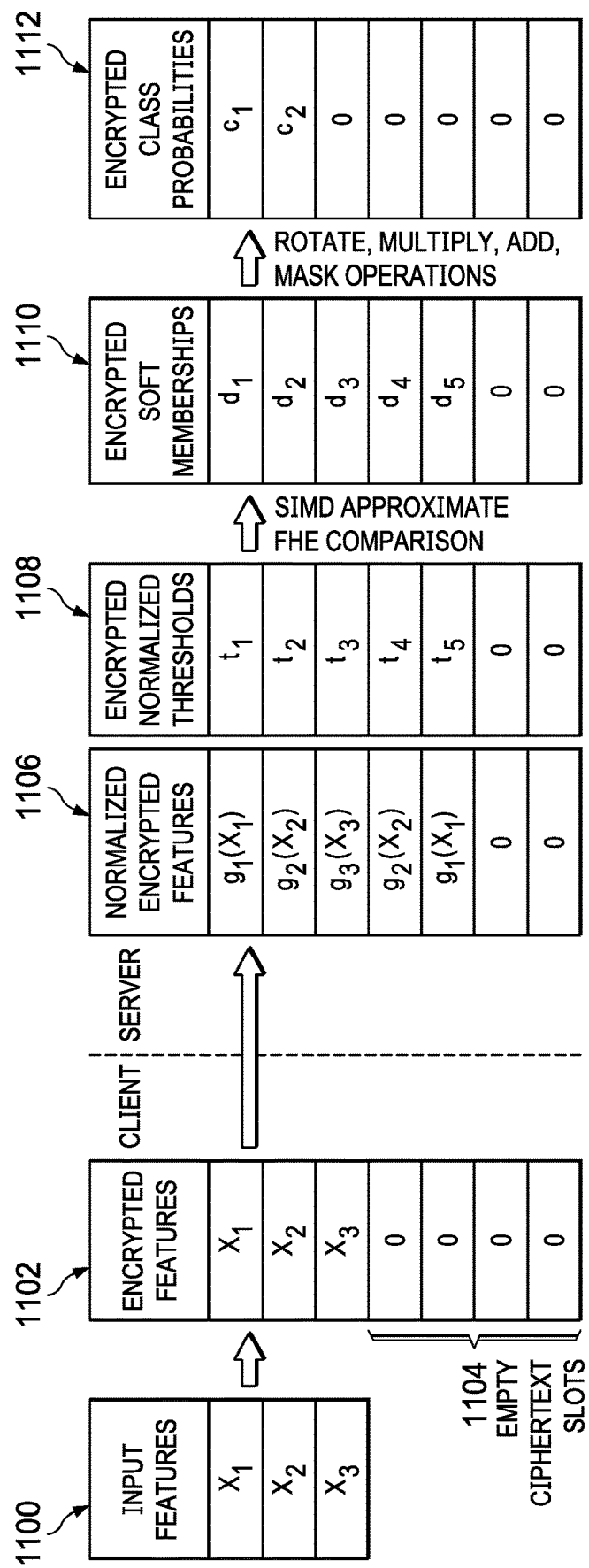
FIG. 11 depicts a first example of the ciphertext packing for the decision tree shown in FIG. 10.

FIG. 11 depicts an example of the ciphertext packing for the above-depicted decision tree. In this example, the client takes the input features 1100 and computes the encrypted features 1102 using its private key. The encrypted features 1100 include the empty ciphertext slots 1104 that will be filled by the packing. As also shown, the server has pre-processed the decision tree to create normalized encrypted features 1106 and encrypted normalized thresholds 1108. Normalization ensures that the above-described computation function EVAL ($a \geq b$)=$a''/(a''+b'')$ evaluates to a value between 0 and 1. Using the inference algorithm depicted in FIG. 7 (which as described exploits the benefits of SIMD operations), the FHE comparisons are computed, resulting in the encrypted soft membership values 1110. Applying one or more operations (e.g., rotate, multiply, add, and mask), the encrypted class probabilities are then output at 1112.

Figure 12:
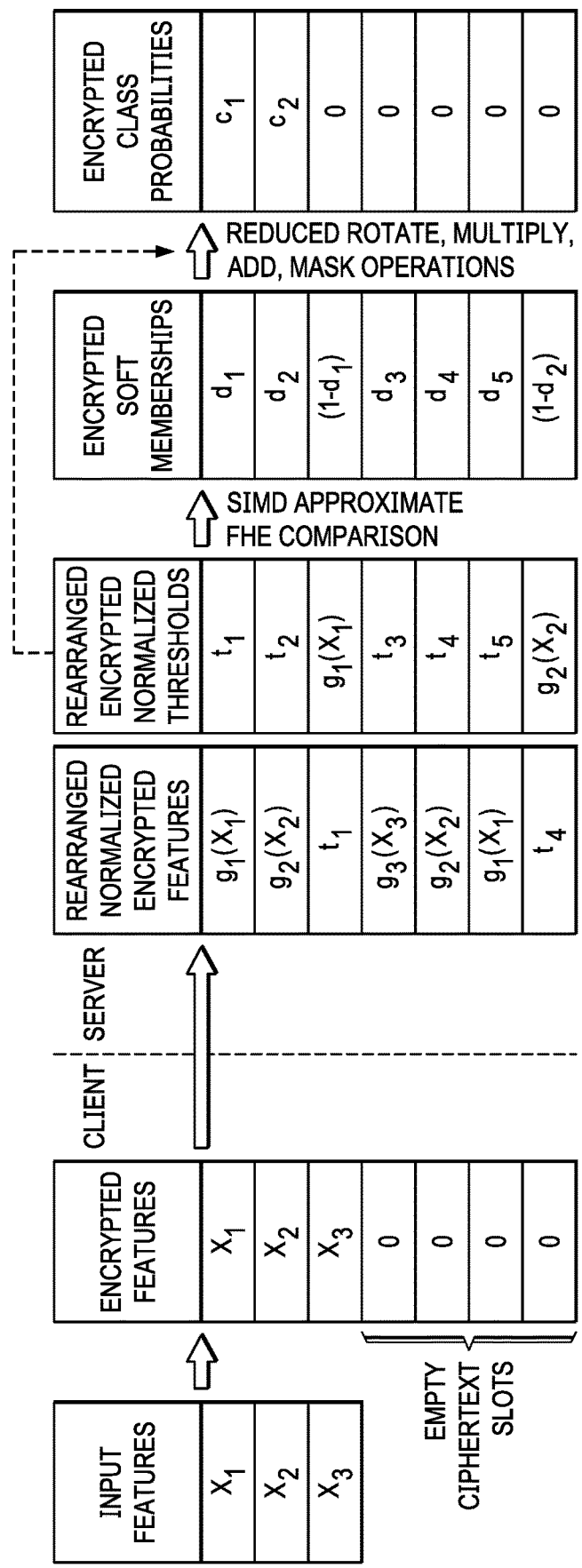
FIG. 12 depicts another ciphertext packing example wherein normalized features are first rearranged to minimize the number of (rotate+multiply+add) operations after pair-wise comparison.

FIG. 12 depicts another ciphertext packing example. In this case, all of the available ciphertext slots are exploited, and the packing optimally rearranges the normalized encrypted features and thresholds to minimize the required number of (rotate+multiply+add) operations after pairwise comparison (the soft membership evaluations). In this example, and viewed from left to right, the client encrypts input features and sends out the encrypted ciphertext to the server. The server rearranges and normalizes both the client's input ciphertext and the thresholds from the decision tree in a way that enable the server to perform the comparisons related to all nodes in the decision tree in a single SIMD operation. Further, this rearranged/repacking strategy enables the server to perform all the downstream operations needed for the final class confidence computations.

Figure 13:
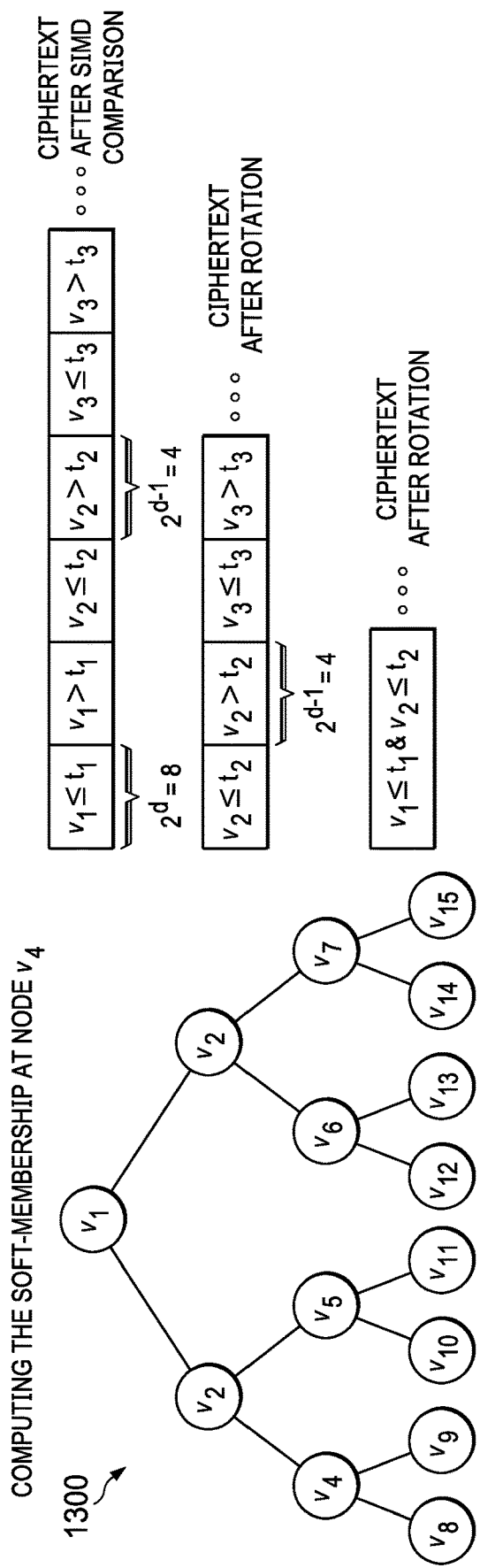
FIG. 13 depicts an example soft membership computation.

FIG. 13 depicts an example soft membership computation, in this case for the decision tree 1300 and its node $v_4$. In this example, and at iteration 0, the ciphertext is rotated by $2^d$ times. The first ciphertext (at the top right) shows the result of the SIMD comparison operation. This ciphertext is rotated such that the comparisons of the next layer (comprising nodes v2 and v3) are aligned with the comparison of $v_1 \leq t_1$. In this example, the product of these two ciphertexts gives the evaluation of the condition for membership at $v_4$—i.e., $v_1 \leq t_1$ & $v_2 \leq t_2$.

Figure 14A:
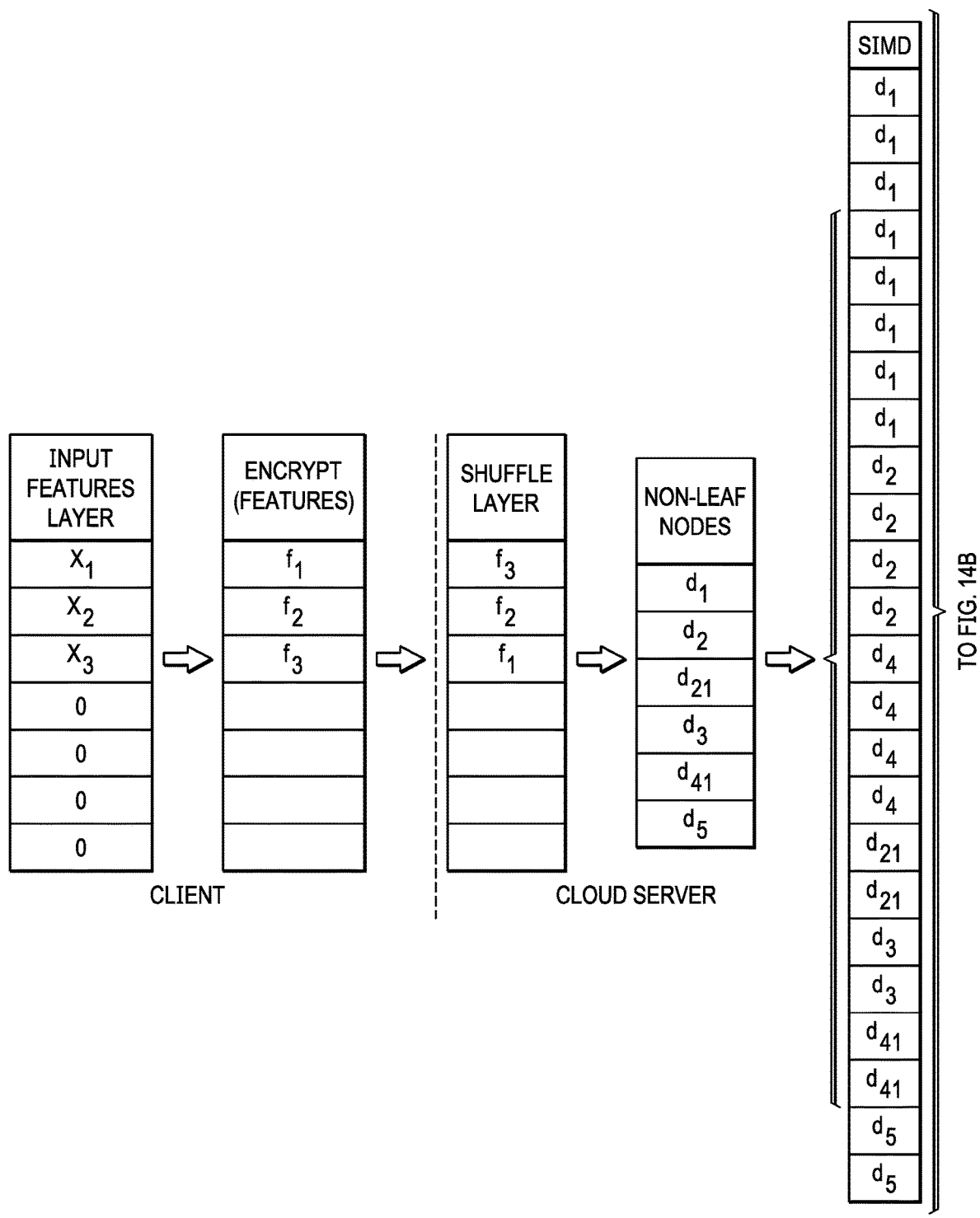
FIG. 14A and FIG. 14B together depict another example of the inference algorithm.
Figure 14B:
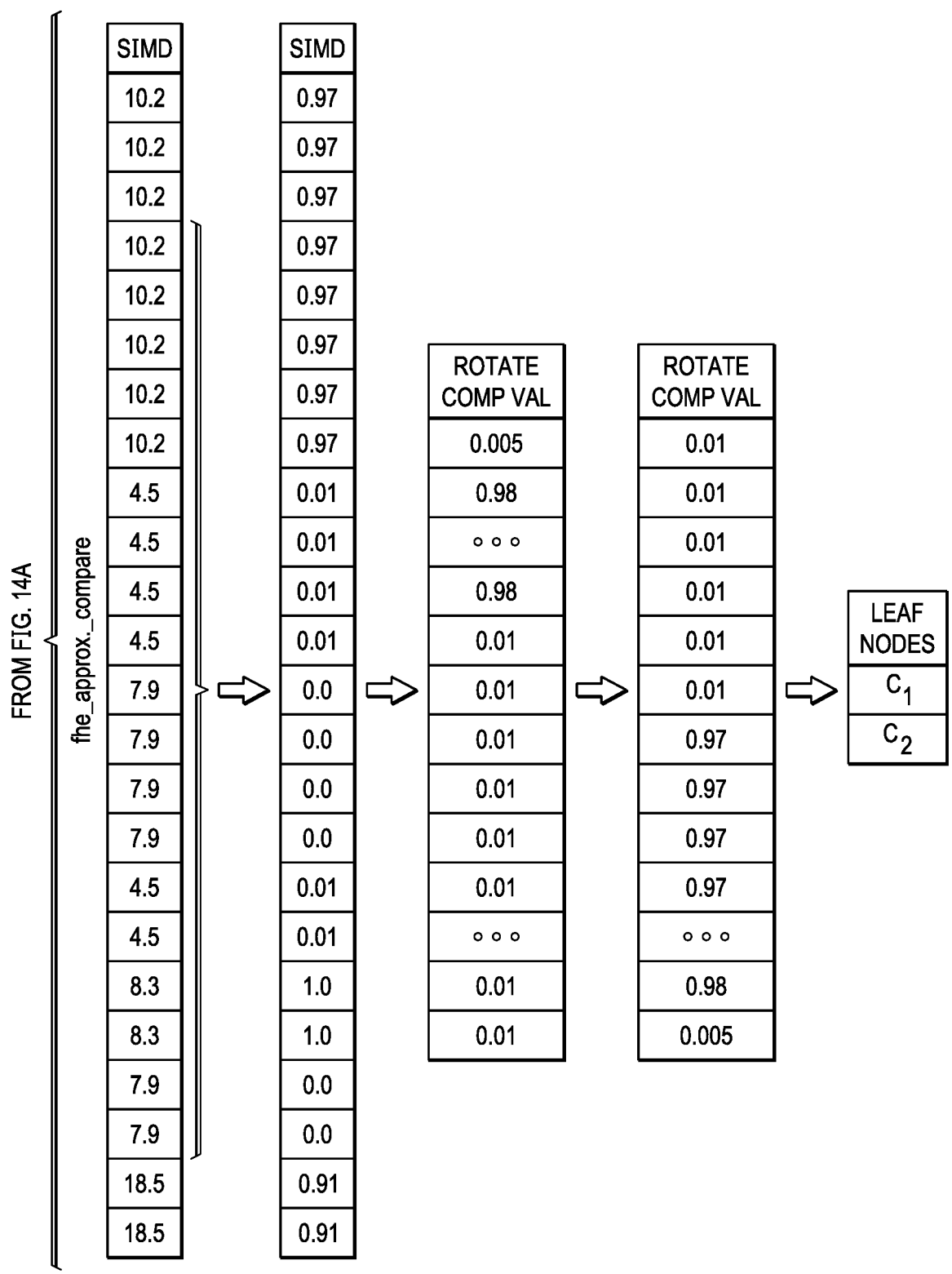

FIGS. 14A and 14B together depict another example scenario wherein a shuffle operation 1400 is incorporated ahead of the SIMD and pairwise computations, followed by one or more rotate operations. This is an illustration of the SIMD computations for the balanced tree example used in FIG. 10. The numbers are for illustration only.

The technique of this disclosure provides significant advantages. As has been described, the approach herein provides for a way to provide privacy-preserving inference on a decision tree, but in a computationally-efficient manner. These advantages are realized even though a decision node in the decision tree cannot be directly implemented in FHE. Using the above-described options for building a decision node and employing oblivious computations and an ArgMax function in FHE, the approach herein provides for a highly-secure and decision tree service. The approach herein preferably leverages an FHE cryptosystem based on the CKKS scheme, although this is not a limitation, as other similar cryptosystems supporting Single Instruction Multiple Data (SIMD) operations may also benefit from the above-described above.

A decision tree may be pre-existing and available, or it be accessible from another source. The decision tree may be balanced or unbalanced. Further, the decision tree may be a classifier, or a regressor. For classifier trees, the values generated by the decision tree evaluation are class labels; for regression trees, the values are real values.

As described, typically a computing system that implements this approach is implemented in software, e.g., as a set of computer program instructions executed by one or more hardware processors. A particular tool or component in the system may comprise any number of programs, processes, execution threads, and the like, together with appropriate interfaces and databases to support data used or created by the tool or component. The tool or component may be configured or administered with a web-based front-end, via a command line, or the like. The tool or component may include one or more functions that are implemented programmatically, or that interoperate with other computing entities or software systems via an application programming interface (API), or any convenient request-response protocol.

Any references herein to one or more commercial products or services are exemplary and should not be taken to limit the disclosed technique, which may be implemented on any system, device, appliance (or, more generally, machine) having the general characteristics and operating functionality that has been described.

As noted, one preferred implementation of this subject matter is as-a-service, but this is not a limitation either. HE-based inferencing may be carried out entirely on-premises or in a standalone operating environment. As previously noted, and without limitation, the subject matter may be implemented within or in association with a cloud deployment platform system or appliance, or using any other type of deployment systems, products, devices, programs or processes. As has been described, the model building or inferencing system functionality may be provided as a standalone function, or it may leverage functionality from other products and services.

A representative cloud application platform with which the technique may be implemented includes, without limitation, any cloud-supported application framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Further, FHE is just a representative cryptographic protocol, and it is not intended to be limited.

Although the approach described above implements FHE-based inferencing in a client-server context, this is not a limitation. The above-described technique may also be implemented within a client that has access to the tree.

Moreover, while inferencing preferably occurs using an HE protocol, the approach herein may be leveraged with other multi-party secure computation techniques and privacy of the test point, the model, or both, desired to be preserved.

The techniques herein provide for improvements to another technology or technical field, namely, HE-based inferencing tools and systems, and cloud-based systems that incorporate or expose such technologies, as well as improvements to the computational efficiency of HE systems and methods.

The particular use case or application for which the decision tree is being used in not a limitation of this disclosure.

Although the approach herein envisions the server performing the operations described (e.g., balancing, encrypted feature preprocessing (e.g., packing and shuffling)) in advance of receipt of the FHE-encrypted data points, this pre-processing is not necessarily a requirement. An alternative approach is that the server performs all of some of this processing on-demand (i.e., dynamically) in response to receipt of the client query.

Having described the subject matter, what is claimed is as follows.

The invention claimed is:

1. A method for privacy-preserving homomorphic inferencing, comprising:
configuring a decision tree;
receiving an encrypted data point;
performing homomorphic inferencing on the decision tree with respect to the encrypted data point using a homomorphic comparison operation, wherein, for a given decision node, the comparison operation comprises a plurality of sub-operations directed to conditional branches of the decision tree, wherein a sub-operation comprises a recursive computation using an evaluation function $EVAL(a \geq b) = a^n/(a^n + b^n)$, where n is a parameter and a and b are positive real numbers in the range [0,1], wherein the sub-operations and a decision resulting from the comparison operation occur on real number-valued features of the encrypted data point; and
returning an encrypted result.

2. The method as described in claim 1 wherein the comparison operation is a fuzzy comparison, and at least one sub-operation performs a pairwise comparison on floating point values.

3. The method as described in claim 1 wherein pairwise comparisons implemented by the plurality of the sub-operations are carried out using a single instruction, multiple data (SIMD) operation for all decision nodes of the decision tree.

4. The method as described in claim 3 wherein the decision resulting from the comparison operation is computed as a single ArgMax function for an aggregated set of confidence class values.

5. The method as described in claim 1 wherein configuring the decision tree converts an unbalanced decision tree into the decision tree.

6. The method as described in claim 5 further including applying a packing function to one or more entries in at least one of: an encrypted feature set, and a threshold data set, to generate a packed ciphertext.

7. The method as described in claim 6 further including rearranging one or more entries in the packed ciphertext prior to executing the comparison operation.

8. An apparatus, comprising:
a processor;
computer memory holding computer program instructions executed by the processor, the computer program instructions configured to provide privacy-preserving homomorphic inferencing, the computer program instructions configured to:
configure a decision tree;
receive an encrypted data point;
perform homomorphic inferencing on the decision tree with respect to the encrypted data point using a homomorphic comparison operation, wherein, for a given decision node, the comparison operation comprises a plurality of sub-operations directed to conditional branches of the decision tree, wherein a sub-operation comprises a recursive computation using an evaluation function $EVAL(a \geq b) = a^n/(a^n + b^n)$, where n is a parameter and a and b are positive real numbers in the range [0,1], and wherein the sub-operations and a decision resulting from the comparison operation occur on real number-valued features of the encrypted data point; and
return an encrypted result.

9. The apparatus as described in claim 8 wherein the comparison operation is a fuzzy comparison, and at least one sub-operation performs a pairwise comparison on floating point values.

10. The apparatus as described in claim 8 wherein pairwise comparisons implemented by the plurality of the sub-operations are carried out in the processor using a single instruction, multiple data (SIMD) operation for all decision nodes of the decision tree.

11. The apparatus as described in claim 10 wherein the decision resulting from the comparison operation is computed as a single ArgMax function for an aggregated set of confidence class values.

12. The apparatus as described in claim 8 wherein the computer program instructions are further configured to convert an unbalanced decision tree into the decision tree.

13. The apparatus as described in claim 12 wherein the computer program instructions are further configured to apply a ciphertext packing function to one or more entries in at least one of: an encrypted feature set, and a threshold data set, to generate a packed ciphertext.

14. The apparatus as described in claim 13 wherein the computer program instructions are further configured to rearrange one or more entries in the packed ciphertext prior to executing the comparison operation.

15. A computer program product comprising a non-transitory computer readable medium for use in a data processing system to provide privacy-preserving homomorphic inferencing, the computer program product holding computer program instructions that, when executed by the data processing system:
configure a decision tree;
receive an encrypted data point;
perform homomorphic inferencing on the decision tree with respect to the encrypted data point using a homomorphic comparison operation, wherein, for a given decision node, the comparison operation comprises a plurality of sub-operations directed to conditional branches of the decision tree, wherein a sub-operation comprises a recursive computation using an evaluation function $EVAL(a \geq b) = a^n/(a^n + b^n)$, where n is a parameter and a and b are positive real numbers in the range [0,1], and wherein the sub-operations and a decision resulting from the comparison operation occur on real number-valued features of the encrypted data point; and
return an encrypted result.

16. The computer program product as described in claim 15 wherein the comparison operation is a fuzzy comparison, and at least one sub-operation performs a pairwise comparison on floating point values.

17. The computer program product as described in claim 15 wherein pairwise comparisons implemented by the plurality of the sub-operations are carried out using a single instruction, multiple data (SIMD) operation for all decision nodes of the decision tree.

18. The computer program product as described in claim 17 wherein the decision resulting from the comparison operation is computed as a single ArgMax function for an aggregated set of confidence class values.

19. The computer program product as described in claim 15 wherein the computer program instructions convert an unbalanced decision tree into the decision tree.

20. The computer program product as described in claim 19 wherein the computer program instructions configure the decision tree by applying a packing function to one or more entries in at least one of: an encrypted feature set, and a threshold data set, to generate a packed ciphertext.

21. The computer program product as described in claim 20 wherein the computer program instructions rearrange one or more entries in the packed ciphertext prior to executing the comparison operation.

* * * * *